(12) United States Patent
Ferrall et al.

(10) Patent No.: US 7,181,329 B2
(45) Date of Patent: Feb. 20, 2007

(54) HIGH TEMPERATURE PROTECTION OF FUEL CELL SYSTEM COMBUSTOR AND OTHER COMPONENTS VIA WATER OR WATER VAPOR INJECTION

(75) Inventors: Joseph Francis Ferrall, Simi Valley, CA (US); Wolfgang Alan Fengler, Torrance, CA (US); James Daniel Powers, Santa Monica, CA (US); Pavel Alexandrovich Sokolov, Redondo Beach, CA (US)

(73) Assignee: General Electric Company, Schenectady, NY (US)

( * ) Notice: Subject to any disclaimer, the term of this patent is extended or adjusted under 35 U.S.C. 154(b) by 241 days.

(21) Appl. No.: 11/010,257

(22) Filed: Dec. 14, 2004

(65) Prior Publication Data

US 2006/0127717 A1    Jun. 15, 2006

(51) Int. Cl.
*H01M 8/04*  (2006.01)
*G06F 19/00* (2006.01)
*H01M 8/12* (2006.01)

(52) U.S. Cl. .......................... 701/101; 429/20; 429/24

(58) Field of Classification Search ................ 701/101, 701/102, 115; 429/13, 19, 24, 26
See application file for complete search history.

(56) References Cited

U.S. PATENT DOCUMENTS

| | | | |
|---|---|---|---|
| 5,928,805 A | 7/1999 | Singh et al. | 429/13 |
| 6,025,083 A | 2/2000 | Veyo et al. | 429/13 |
| 6,374,166 B1* | 4/2002 | Takeda | 701/22 |
| 6,432,568 B1* | 8/2002 | Salvador et al. | 429/19 |
| 6,436,561 B1* | 8/2002 | Hart-Predmore et al. | 429/12 |
| 2003/0235732 A1 | 12/2003 | Haltiner, Jr. | |

\* cited by examiner

*Primary Examiner*—Hieu T. Vo
(74) *Attorney, Agent, or Firm*—Nixon & Vanderhye P.C.

(57) ABSTRACT

A system and method are disclosed for high temperature protection of combustor and other components by controlling the temperature of combustion chamber gases in a fuel cell system tail gas burner using a nozzle or plurality of nozzles to inject water or water vapor upstream, downstream or directly into the combustion chamber. A variable speed pump, actuated valve or other flow metering device regulates the supply of water or water vapor to the nozzles. For the case of water vapor, an evaporator is required between the pump and nozzles. Flow regulation is effected by a control algorithm that reacts to combustor temperature, changes in the power production of the fuel cell system and/or other related system parameters.

26 Claims, 3 Drawing Sheets

HIGH TEMPERATURE PROTECTION OF FUEL CELL SYSTEM COMBUSTOR AND OTHER COMPONENTS VIA WATER OR WATER VAPOR INJECTION

BACKGROUND OF THE INVENTION

The present invention is directed to fuel cell combustors, and, in particular, to a system and method for injecting water or water vapor into a fuel cell tail gas combustion chamber to regulate combustion temperature.

Fuel cell systems often use a tail gas burner to combust excess stack reactants. During some operating modes, reactant mixtures exist in quantities that can lead to excessively high temperatures in the burner and other equipment downstream of a fuel cell stack. These high temperatures can lead to long term system reliability degradation and even component or system failures.

One method of countering this problem has been to construct the combustion chamber from materials that are tolerant to the high temperatures that may occur. These materials are typically either special metal alloys, ceramics or some combination thereof. However, these materials are generally expensive and/or difficult to fabricate.

Another method of countering this problem has been to cool the vulnerable walls of the combustion chamber with a heat transfer fluid. This also complicates the construction of the burner and may decrease efficiency.

A third method of countering this problem has been to flow excess oxidant through the fuel cell system. This requires a larger oxidant pumping device, which increases system cost and decreases system efficiency, since the oxidant most used in fuel cell systems, i.e., air, is not a good heat transfer medium and gasses require more energy to move than do liquids.

BRIEF DESCRIPTION OF THE INVENTION

The present invention seeks to overcome the drawbacks of the prior methods of controlling the combustion chamber temperature in a fuel cell system tail gas burner by using a nozzle or plurality of nozzles to inject water or water vapor into the combustion chamber. The physical properties of water and water vapor provide superior heat transfer and heat absorption characteristics, compared to currently used cooling fluids. Water is readily available, and water or water vapor is often already in use in other fuel cell system components. Given the physical properties of water and water vapor, the devices of the present invention regulating injection of such water or water vapor require less energy than those for other fluids, which provides superior component protection without greatly impacting system efficiency.

The present invention consists of a water or water vapor source, a means of guiding the flow of the water or water vapor, a means of regulating the flow and/or pressure of the water or water vapor and a nozzle or plurality of nozzles to inject the water or water vapor either upstream, downstream or directly into the fuel cell system tail gas combustion chamber.

In one embodiment of the present invention, the nozzles provide a high degree of atomization for liquid water or a well-dispersed spray pattern for water vapor. A variable speed pump, actuated valve or other metering device regulates the supply of water or water vapor to the nozzles. For the case of water vapor, an evaporator is required between the pump and nozzles. Flow regulation is effected by a control algorithm that reacts to combustor temperature, changes in the power production of the fuel cell system and/or other related system parameters. While the fuel cell system is producing electricity, the pump causes a nominal amount of water to flow in concert with the normal control functions of the fuel cell system to regulate combustor temperature. This negates the need to overcome the starting inertia of the pump, allowing the control system to react more quickly, should the water be needed to control a sudden temperature spike, without consuming significant amounts of water.

DETAILED DESCRIPTION OF THE INVENTION

Figure 1:
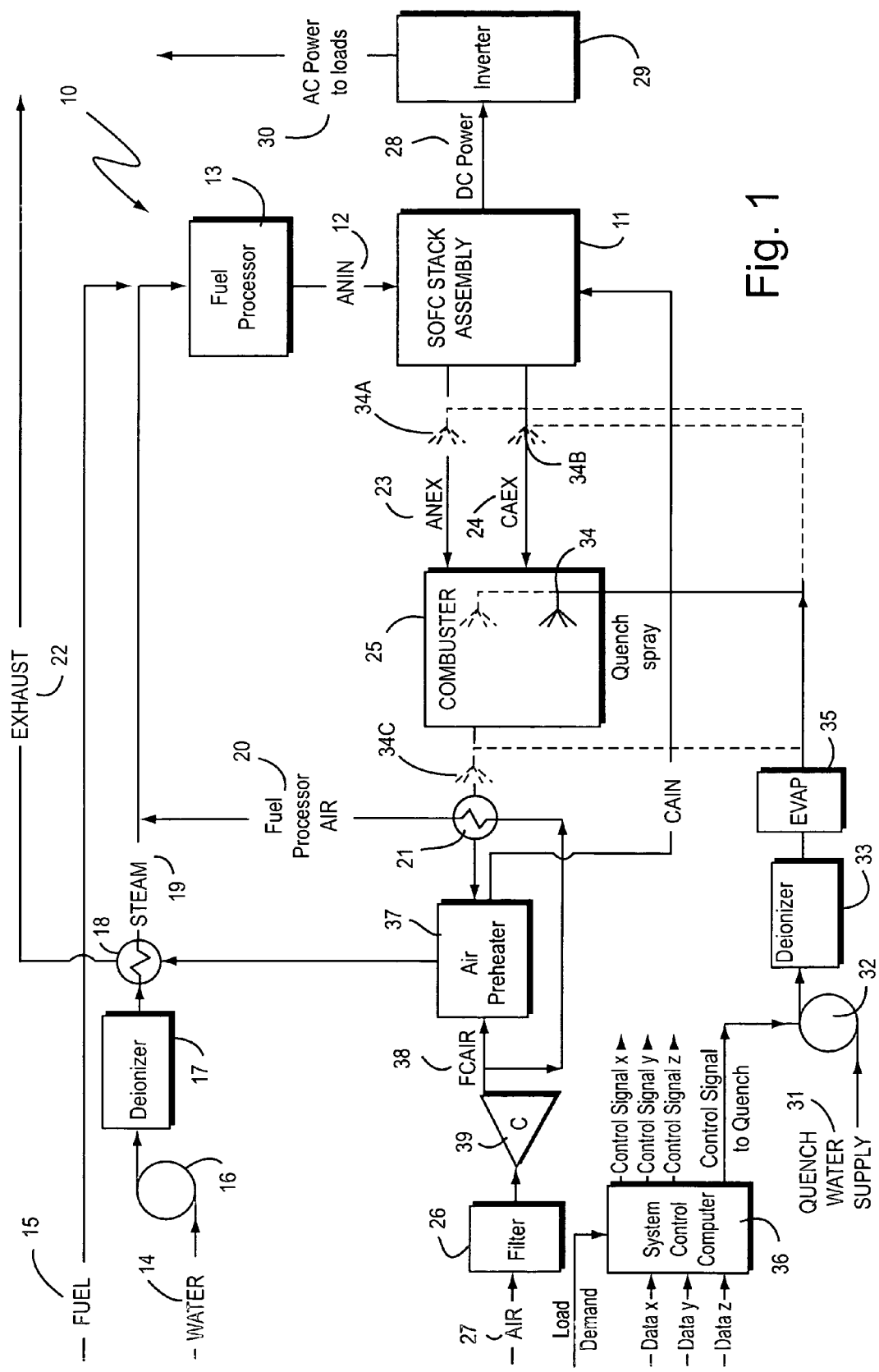
FIG. 1 is a process flow schematic using the water quenching concept of the present invention.

FIG. 1 is an example of a process flow schematic of a fuel cell combustor system 10 using the water or water vapor injection temperature control system and method of the present invention. System 10 includes a solid oxide fuel cell ("SOFC") stack assembly 11 into which fuel 12, designated as "anode in" ("ANIN"), is inputted. The fuel 12 inputted to stack assembly 11 is produced by a fuel processor 13, which receives both fuel 15 and steam 19 to generate stack fuel 12. Steam 19 is produced from water 14, which is pumped by a pump 16 through a deionizer 17 into a heat exchanger 18. The deionized water is turned into steam 19 using heat from hot gas input into heat exchanger 18 from an air preheater 23. Steam 19 is also mixed with fuel processor air 20 produced by a second heat exchanger 21 receiving heat from hot gas from a fuel cell tail gas combustion chamber 25 connected to stack assembly 11.

Stack assembly 11 exhausts excess stack reactants, which include a fuel stream 23 and an air stream 24. The fuel stream 23 is designated as "anode exit" ("ANEX"). Fuel stream 23 is a mix of gases, including hydrogen, water vapor, carbon monoxide, carbon dioxide, nitrogen and methane. Air stream 24 is designated as "cathode exit" ("CAEX"). Both streams 23 and 24 are input into combustor 25 for the purpose of combusting these excess stack reactants. During some operating modes, reactant mixtures in stack assembly 11 can exist in quantities that can lead to excessively high temperature in stack assembly 11, combustor 25 and other equipment downstream of stack 11. These high temperatures can lead to long-term system reliability degradation and even component or system failures.

The exhaust of combustor 25 is a high temperature gas which is fed into heat exchanger 21 to heat air input into exchanger 21 to produce fuel processor air 20 that is mixed with steam 19 prior to the insertion of such mixture into fuel processor 13. Such exhaust gas is also introduced into an air preheater 37 for the purpose of heating incoming air 38, designated as "fuel cell air" ("FCAIR"). Fuel cell air 38 is compressed air which is produced from air 27 filtered by a filter 26 and input into a compressor 39. A portion of the output of compressor 39, which is fuel cell air 38, is input into air preheater 37, after which it is fed into stack 11.

In the embodiment of the present invention, shown in FIG. 1, there is provided a water or water vapor source 31, which is fed through pipes to a variable speed pump, actuated valve or other metering device 32 that regulates the supply of such water or water vapor to at least one nozzle 34 located in combustor 25. The operation of metering device 32 is controlled by a suitable control circuit, such as a computer 36, which uses a control algorithm to decide whether to have metering device 32 produce more or less water or water vapor to nozzles 34 to regulate combustor temperature. Preferably, the control algorithm reacts to combustion temperature, the power production of the fuel cell system and/or other related system parameters to regulate the supply of water or water vapor to the nozzles.

Preferably, the control algorithm used in the system control computer 36 includes feedforward and feedback inputs to modulate the water or water vapor flow, and thus, the temperature of combustor 25. The feedforward input uses a map, transfer function, neural network or similar logic structure to determine a flowrate setting based on any combination of the following data (as either actual monitored values or setpoints): load demand, combustor temperature, fuel utilization, air utilization, steam-to-carbon ratio, oxygen-to-carbon ratio, fuel flow rate, cathode air flow rate. Monitoring of these values is a function that is typically performed as part of the normal operation of a system, such as fuel cell system 10, and thus well known to persons of ordinary skill in the art.

The input data signals to System Control Computer 36, shown generally in FIG. 1 as "x", "y", and "z", can be signals providing data about system temperatures, pressures, flow rates, etc. Likewise, the control signals from System Control Computer 36, again shown generally in FIG. 1 as "x", "y", and "z", can be signals to valves, compressors, pumps, etc. The inputs to and outputs from System Control Computer 36 shown in FIG. 1 depict a typical SOFC system where, when power is being produced, there are inputs to the controller, which include a load demand and various system data from sensors that are used in algorithms in Computer 36 to send control signals that actuate a control action. In the present invention, the data normally collected is used by the control algorithm resident in System Control Computer 36 to control the quench water supply used by the present invention.

The most dangerous condition, in terms of combustor 25 exceeding its upper operating limits, is during a sudden loss of load event while the fuel cell system 10 is operating with a large load. A special algorithm for reacting to this condition is used in which the occurrence of this condition is monitored and the flow of water or water vapor 31 is quickly ramped up to prevent a temperature spike from the sudden inrush of excess fuel that would result from this scenario. The feedback input uses the temperature downstream of combustor 25 through a proportional-integral-derivative ("PID") type controller to trim the flowrate based on a setpoint for the temperature of combustor 25. This temperature setpoint is scheduled based on the same kind of parameters identified above. The output is the sum of the feedback and feedforward inputs. The control system could also use either the feedforward or feedback inputs on their own, although the combined control strategy described above provides more optimal performance.

The output of metering device 32 is fed into a second deionizer 33 prior to being fed into nozzle 34. Nozzle 34 can also be a plurality of nozzles, and whether one nozzle or a plurality of nozzles are used, such nozzles would provide a high degree of atomization for liquid water or a well-dispersed spray pattern for water vapor. In the case of water vapor, an evaporator 35 would be required between metering device 32 and nozzles 34.

Nozzles 34 can also be located either upstream of combustor 25 in the fuel stream 23, anode exit ("ANEX"), exiting from stack 11. In this instance, nozzles 34 are shown in FIG. 1 with the designation "34A". An alternate upstream location is would be in the air stream 24 cathode exit ("CAEX"), also exiting from stack 11. In this alternate stream location, nozzles 34 are shown with the designation "34B".

Such nozzles can also be located downstream of combustor 25, and in such instance they would be located in the exhaust of combustor 25 that is fed to heat exchanger 21. In this latter instance, nozzles 34 are shown in FIG. 1 with the designation "34C". Here, equipment downstream of combustor 25, but not combustor 25 itself, is protected.

Stack assembly 11 outputs DC electrical power 28, which is input to an inverter 29 to produce AC electrical power 30 that is fed to any loads that are driven by stack assembly 11. While the fuel cell system 10 is producing electricity, metering device 32 typically produces a nominal amount of water flow in concert with the normal control functions of system 10 to regulate the temperature of combustor 25. This nominal flow of water negates the need to overcome starting inertia, should metering device 32 be a pump, allowing a control system 36 to react more quickly, should water be needed to control a sudden temperature spike, as discussed above, without consuming significant amounts of water.

Figure 2:
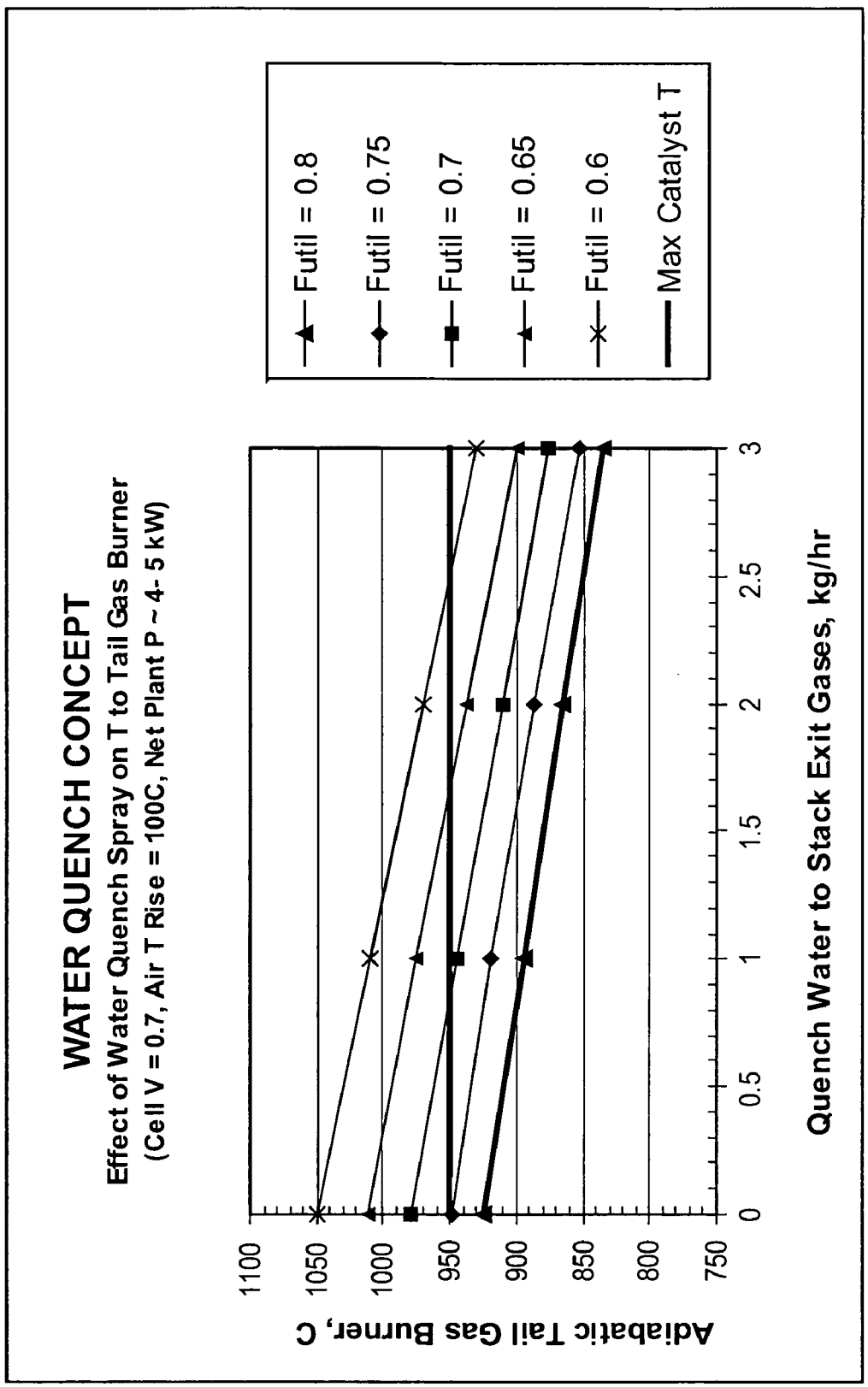
FIG. 2 is a graph showing the effect of quench water flow rate and fuel utilization on the adiabatic temperature of a combustor.

FIG. 2 is a graph showing the effect of injecting water into a fuel cell tail gas combustion chamber to regulate temperature according to the system and method of the present invention. The graph of FIG. 2 includes several plots showing the effect of injecting water on the temperature of the tail gas combustion chamber for several fuel cell operating modes where fuel utilization varies from a minimum of 0.6 to a maximum of 0.8 of the fuel injected into the SOFC stack assembly 11. As can be seen from the graph of FIG. 2, the lower the level of fuel utilization is, the higher the temperature will be in combustion chamber 25. As can also be seen from the graph of FIG. 2, given that the slopes of the several plots are substantially the same for the several fuel utilization levels, the lower the level of fuel utilization is, the higher the amount of water will be necessary to maintain the temperature in combustion chamber 25 below the maximum catalyst temperature of 950° C. specified for the application depicted in FIG. 1. Thus, where fuel utilization is 0.6 (or 60%), to keep the temperature in the tail gas combustion chamber 25 burner below 950° C., approximately 2.5 to 3.0 kg/hr of water must be injected into the combustion chamber 25. Conversely, where fuel utilization climbs to 0.8 (or 80%), to keep the temperature in the tail gas combustion chamber 25 burner below 950° C., no water is required since the temperature at 0.8 utilization is approximately 925° C. where no water is being injected into the combustion chamber 25. Nevertheless, as the amount of injected water is increased to a maximum of 3 kg/hr, the temperature at 0.8 fuel utilization drops to approximately 840° C., a more desirable temperature to provides greater fuel cell system component protection without greatly impacting system efficiency. With regard to the latter, it has been found that a maximum of approximately 3 kg/hr of water can be introduced into the burner without a drop in temperature that would be adverse to the operation of the system.

Figure 3:
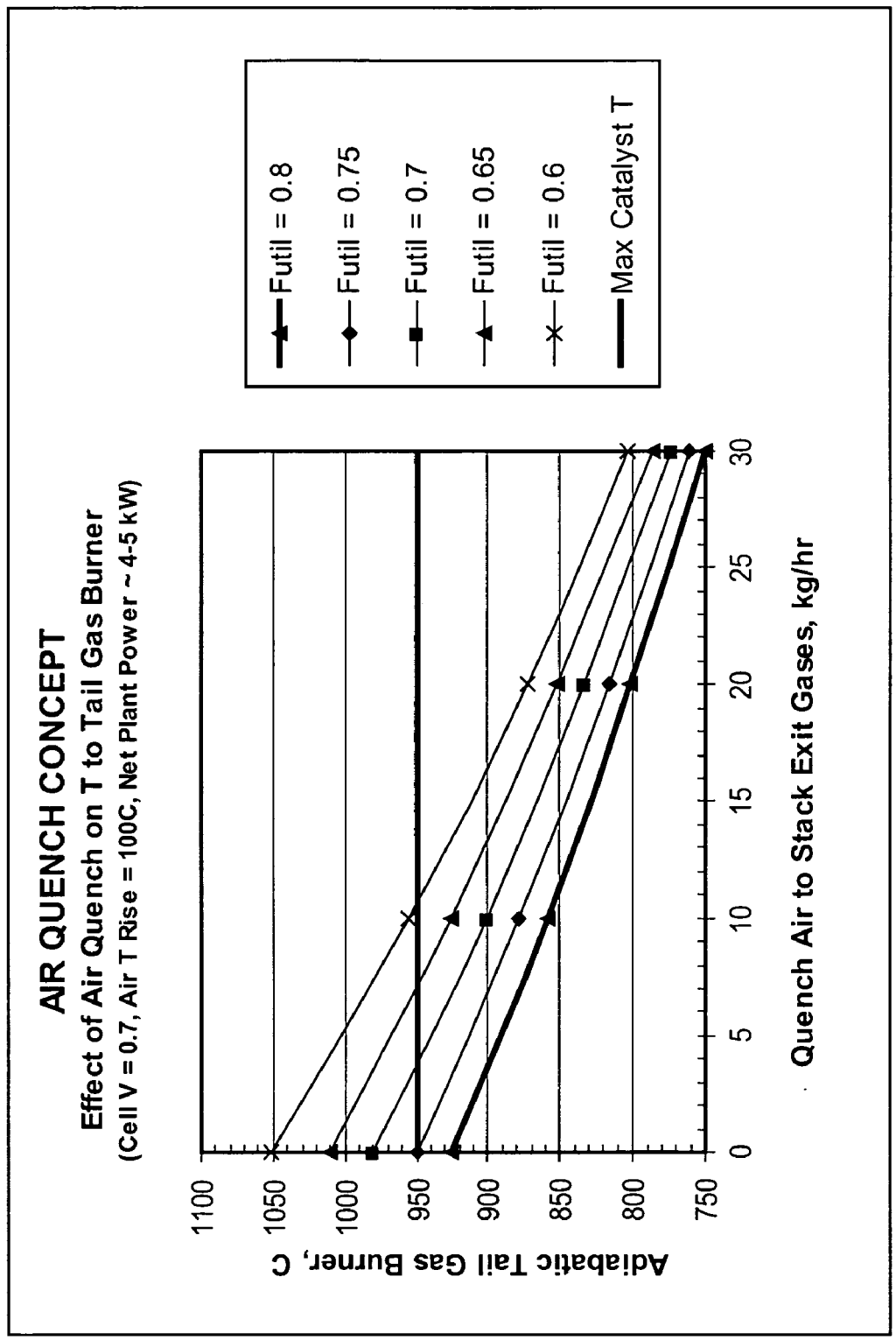
FIG. 3 is a graph showing the effect of quench air flow rate and fuel utilization on the adiabatic temperature of a combustor.

FIG. 3 is a graph showing the effect of injecting air into a fuel cell tail gas combustion chamber to regulate temperature. The graph of FIG. 3 again includes several plots showing the effect of injecting the air on the temperature of the tail gas combustion chamber for several fuel cell operating modes where fuel utilization again varies from a minimum of 0.6 to a maximum of 0.8 of the fuel injected into the SOFC stack assembly 11. As can be seen from the graph of FIG. 3, a much larger amount of fluid flow is necessary for the air to regulate the temperature of the tail gas combustion chamber. Thus, in the instance where fuel utilization is 0.8, to lower the temperature in the tail gas combustion chamber from approximately 930° C., where no air is being injected into the combustion box, down to approximately 840° C., the amount of air must be increased to about 12 kg/hr per hour, about four times the amount of water flow needed to achieve the same temperature reduction at 0.8 fuel utilization.

Thus, given the physical properties of water and water vapor, which provide superior heat transfer and heat absorption characteristics, compared to air, the results achieved by injecting water or water vapor into a tail gas combustion chamber include the need for less energy than that needed for other fluids, while providing superior system component protection without greatly impacting system efficiency.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for providing temperature protection in a fuel cell system tail gas burner and/or other components, the system comprising:
    a source of water or water vapor,
    at least one nozzle to inject the water or water vapor upstream, downstream and/or directly into the tail gas burner's combustion chamber,
    a metering device for regulating the supply of the water or water vapor to at least one nozzle,
    a computer and control algorithm for regulating the metering device and thereby, the supply of water or water vapor to the at least one nozzle.

2. The system of claim 1, wherein the source is water vapor and the system further comprises an evaporator located between the metering device and the at least one nozzle.

3. The system of claim 1, wherein the control algorithm reacts to combustion temperature to regulate the supply of water or water vapor to the at least one nozzle.

4. The system of claim 3, wherein the control algorithm includes feedforward and feedback inputs to modulate the water or water vapor flow, and thus, the temperature of the combustion chamber.

5. The system of claim 4, wherein the feedforward input uses a logic structure selected from the group consisting of a map, a transfer function, and a neural network to set a flowrate for the water or water vapor flow.

6. The system of claim 5, wherein the flowrate setting based on at least one actual monitored value or setpoint selected from the group consisting of load demand, combustor temperature, fuel utilization, air utilization, steam-to-carbon ratio, oxygen-to-carbon ratio, fuel flow rate, and cathode air flow rate.

7. The system of claim 1, wherein the control algorithm reacts to the power production of the fuel cell system to regulate the supply of water or water vapor to the at least one nozzle.

8. The system according to claim 1, wherein the computer controls the metering device to produce a nominal amount of water flow in concert with normal control functions of the fuel cell system while the fuel cell system is producing electricity to thereby regulate combustor temperature.

9. The system of claim 1, wherein the at least one nozzle is located in the fuel excess stack reactant exhausted by the fuel cell, whereby the water or water vapor is injected upstream of the tail gas burner's combustion chamber.

10. The system of claim 1, wherein the at least one nozzle is located in the cathode excess stack reactant exhausted by the fuel cell, whereby the water or water vapor is injected upstream of the tail gas burner's combustion chamber.

11. The system of claim 1, wherein the at least one nozzle is located in the excess combustion reactants exhausted by the tail gas burner, whereby the water or water vapor is injected downstream of the tail gas burner's combustion chamber.

12. The system of claim 1, wherein a plurality of nozzles are used to inject the water or water vapor.

13. The system of claim 1, wherein the metering device is a device selected from the group consisting of a pump and an actuated valve.

14. A system for providing temperature protection in a fuel cell system tail gas burner and/or other components, the system comprising:
    a source of water or water vapor,
    means for injecting the water or water vapor upstream, downstream and/or directly into the tail gas burner's combustion chamber,
    means for guiding the flow of the water or water vapor to the injecting means,
    means for regulating the flow and/or pressure of the water or water vapor flowing to the injecting means, and
    control means for controlling the regulating means to thereby perform said regulation of the water or water vapor.

15. The system of claim 14, wherein the control means includes a control algorithm for controlling the regulating means.

16. The system of claim 15, wherein the control algorithm reacts to combustion temperature to regulate the supply of water or water vapor to the injecting means.

17. The system of claim 15, wherein the control algorithm reacts to the power production of the fuel cell system to regulate the supply of water or water vapor to the injecting means.

18. The system of claim 15, wherein the control algorithm includes feedforward and feedback inputs to modulate the water or water vapor flow, and thus, the temperature of the combustion chamber.

19. The system of claim 18, wherein the feedforward input uses a logic structure selected from the group consisting of a map, a transfer function, and a neural network to set a flowrate for the water or water vapor flow.

20. The system of claim 19, wherein the flowrate setting based on at least one actual monitored value or setpoint selected from the group consisting of load demand, combustor temperature, fuel utilization, air utilization, steam-to-carbon ratio, oxygen-to-carbon ratio, fuel flow rate, and cathode air flow rate.

21. The system according to claim 14, wherein the control means controls the regulation means to produce a nominal amount of water flow in concert with normal control functions of the fuel cell system while the fuel cell system is producing electricity to regulate combustor temperature.

22. A method for regulating combustion temperature in a fuel cell system tail gas burner comprising the steps of:
   providing a source of water or water vapor,
   injecting the water or water vapor upstream, downstream and/or directly into the tail gas burner's combustion chamber,
   regulating the flow and/or pressure of the water or water vapor being injected using a control algorithm which includes feedforward and feedback inputs to modulate the water or water vapor flow, and thus, the temperature of the combustion chamber.

23. The method of claim 22, wherein the feedforward input uses a logic structure selected from the group consisting of a map, a transfer function, and a neural network to set a flowrate for the water or water vapor flow.

24. The method of claim 23, wherein the flowrate setting based on at least one actual monitored value or setpoint selected from the group consisting of load demand, combustor temperature, fuel utilization, air utilization, steam-to-carbon ratio, oxygen-to-carbon ratio, fuel flow rate, and cathode air flow rate.

25. The method of claim 22, wherein the source is water and the method further comprises the step of evaporating the water prior to its being injected.

26. The method of claim 22, wherein the flow and/or pressure of the water or water vapor is regulated to produce a nominal amount of water flow in concert with normal control functions of the fuel cell system while the fuel cell system is producing electricity to regulate combustor temperature.

* * * * *